2,902,796
Patented Sept. 8, 1959

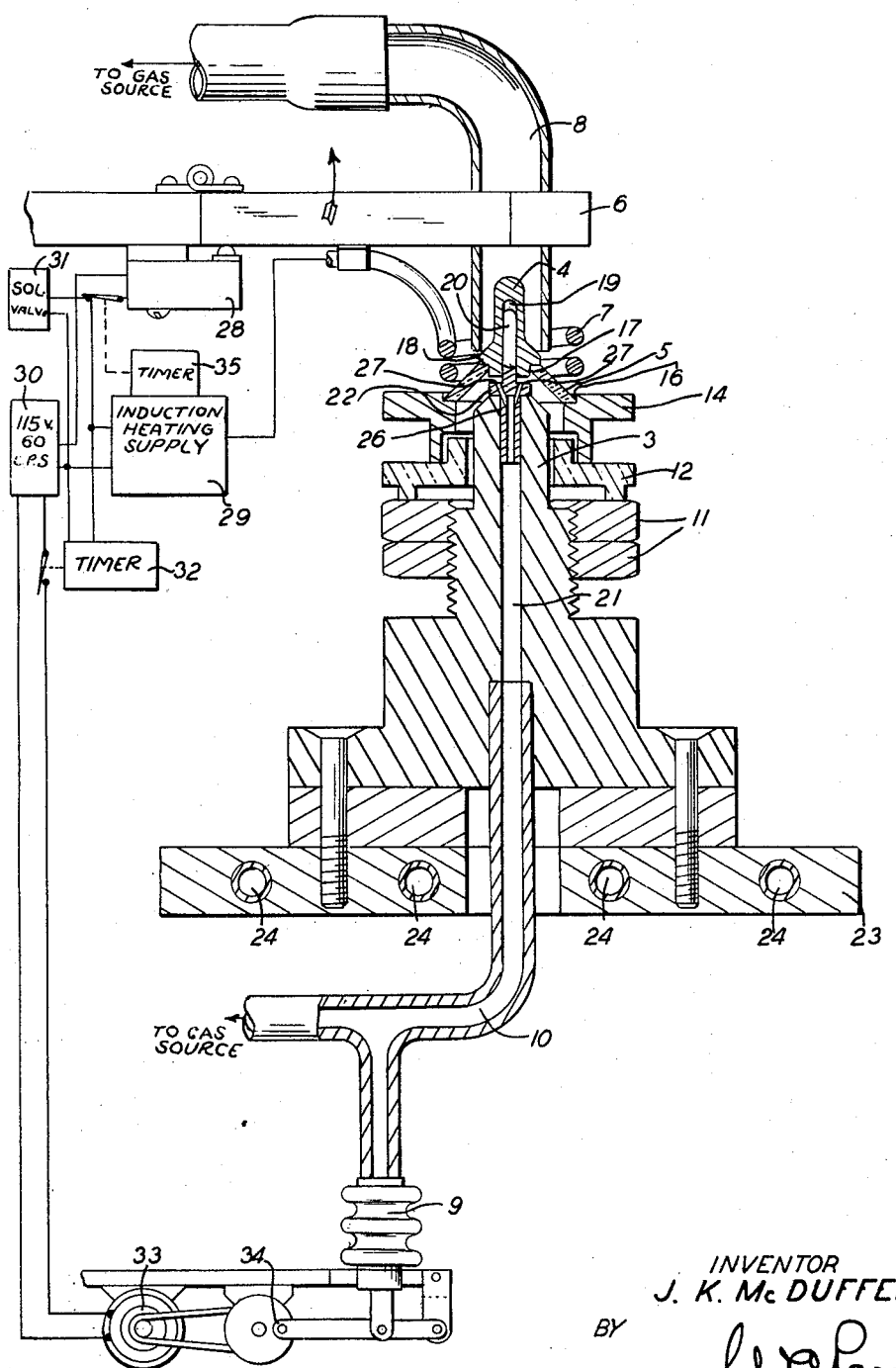

2,902,796

METHOD AND APPARATUS FOR SEALING METAL TO GLASS

John K. McDuffee, Kutztown, Pa., assignor to Western Electric Company, Incorporated, New York, N.Y., a corporation of New York Application September 27, 1955, Serial No. 536,972

4 Claims. (Cl. 49—1)

This invention relates to glass-to-metal sealing and particularly to a method and apparatus for making such seals.

In making metal-to-glass seals, while it is usually desirable from a structural standpoint to attach the glass to the metal part over a wide area, product specifications sometimes limit the seal area to very specific bounds. For example, in the manufacture of vacuum tubes of the type shown in Patent 2,527,127 to Messrs. R. S. Gromley, C. Maggs and L. F. Moose which issued October 24, 1950, the anode terminal is sealed within a glass annulus and the seal area is confined to a narrow band around the end of the terminal.

The object of this invention is a method of and apparatus for accurately fusing such glass to metal seals as required for the production of a uniform product.

In accordance with the general features of the invention, metal anode terminals are first oxidized (it is well known in the vacuum tube art that glass will wet to an oxidized surface much easier than to an un-oxidized one) and the oxidized terminals are then assembled in substantial fusing relation with the glass seal members, the glass being pre-formed to receive the terminals and thereby shield the desired fusing surface. The terminals and the glass members are then heated to fusing temperature while a reducing gas is applied to the terminals to remove the oxide from the unshielded surfaces adjacent the desired fusing surface. Then when the glass surrounding the fusing area becomes plastic, it will wet only to the remaining oxide surface thereby producing the desired, accurately defined seal.

According to an important feature of the invention, the reducing gas is supplied to both sides of the glass member and, when the glass becomes plastic, the pressure of the gas applied to the underside is pulsated to agitate the parts to move them into sealing contact and insure a complete and uniform seal therebetween.

According to another feature of the invention, the glass surrounding the fusing area is conductively heated to equalize expansion and to release internal stresses and strains arising from the cooling of the fused parts thereby preventing cracking in the glass due to un-uniform cooling of the members.

A preferred embodiment of the invention for fusing glass and metal members includes a metal heat plate adjustably positioned on a spindle for supporting the parts to be fused. The spindle limits or fixes the final positioning of the metal member when the glass becomes plastic and settles, the heat plate absorbing energy from an induction heating coil which heats the metal member and surrounding glass to fusing temperature. A reducing gas is applied both above and below the fusing or seal area for removing the oxide from the unshielded pre-oxidized metal member, the desired fusing surface on the metal member being shielded by the abutting glass of the glass member. A bellows arrangement in the gas supply line to the lower side of the fusing area is used to pulsate the pressure of the gas supplied thereto to agitate the members to move them into sealing contact for seating the metal in the plastic glass.

These and other features of the invention will be more fully understood from the following detailed description of the drawing in which the single figure is a side elevational view, partly in section, of a fixture for fusing glass seal members to anode terminals which incorporates the teachings of the invention.

Referring now to the drawing, the fixture in general includes a central spindle 3 for supporting an oxidized metal terminal 4 and a conically shaped glass seal member 5, a pivoted upper support 6 for an induction heating coil 7 and a quartz gas supply tubing 8, a reciprocatable bellows 9 for a lower gas supply tubing 10 and a control circuit for the fixture.

The mid-portion of the spindle 3 which is made of copper, is threaded for a pair of locking nuts 11 which adjustably support an insulating member 12 and a stainless steel heat sink 14. The heat sink 14 contains an annular groove 16 for receiving, when the support 6 is moved up out of the way, the glass member 5. A preformed central hole in the member 5 is provided for receiving the lower, cylindrical shank portion 17 of the terminal 4. An annular ridge 18 on the terminal 4 limits the movement of the terminal in the hole and forms the upper fusing boundary. The terminals 4 contain axial apertures 19 for receiving a fixed guide pin 20 when they are pre-assembled in the glass seal members 5 and positioned in the fixture.

The guide pin 20 is force fitted into a central aperture 21 and has an annular shoulder or stop 22 spaced below the lower end of a terminal 4 positioned on a glass seal member 5 in the fixture. This shoulder 22 limits the downward travel of the terminal when the glass becomes soft during the fusing operation and the weight of the terminal forces it down. The base plate 23 for the spindle is water cooled by means of the water passages 24 therein to conductively cool the guide pin 20 so that during the fusing operation, the lower end of the cylindrical portion 17 of the terminal will be cooled to increase the viscosity of the plasticized glass surrounding the end thereby preventing the wetting of the glass on to the end surface thereof. This wetting is also prevented by reducing the oxide from the end of the terminal as will be discussed below.

A reducing gas such as a mixture of 98% nitrogen and 2% hydrogen, from a common source not shown in the drawing, is supplied to both the upper and lower sides of the pre-assembled members in the fixture when the fusing operation is started by means of the tube 8 on support 6 and tube 10 which is connected to the central aperture 21 in the spindle. Longitudinal slots 26 on opposing sides of the pin 20 in the aperture 21 and holes 27 in the shoulder 22 allow the gas to be supplied to the lower side of the glass seal member 5. The gas reduces the oxide on the metal terminal except for the oxide on the lower shank portion which is shielded from the reducing gas by the abutting glass seal member.

When the glass becomes plastic the bellows 9 is actuated to change the pressure of the gas supplied to the lower side of the seal to a pulsating one to agitate the members and insure complete wetting of the glass around the shank of the terminal 4 as required for a good, uniform seal.

The control circuit shown schematically for operating the fixture includes a normally open switch 28 which is closed when the support 6 is moved down to start the fusing operation. When the switch is operated, an energizing circuit is closed from an alternating current source 30 to an induction heating supply 29 for the coil 7 and for a solenoid air valve 31. The valve 31 is located in a common supply line (not shown) which branches into tubings 8 and 10. Then while the members are being heated, the reducing gas atmosphere is provided in the fixture. After a timed interval, a timer 32, which is energized, when switch 28 is closed, operates to close an energizing circuit for a motor 33 which drives an eccentric 34 for the bellows 9. When a timer 35 for the induction heating supply times out to open the energizing circuits for the motor 33, the induction heating supply 29 and the solenoid air valve 31 are all opened shutting off the gas supply, de-energizing the heating coil and stopping the bellows actuator.

The heat sink 14 absorbs sufficient energy from the coil 7 to conductively heat the lower supporting edge of the glass seal member 5 to expand the glass particularly the outer circumferential portion to approximately equal the expansion produced in the center as the fused seal is formed. This reduces the severity of internal strains upon cooling.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The method of sealing a glass member to an oxidized metal member said glass member being pre-formed to receive the metal member in substantially the desired fusing relation, the steps of positioning the members in substantial fusing relation whereby the glass member shields the desired fusing surface of the metal member, heating the members to fusing temperature, applying a reducing gas to the metal member to remove the oxide from the unshielded surfaces adjacent the desired fusing surface to prevent glass from wetting and adhering thereto and pulsating the pressure of the gas when the glass becomes plasticized to agitate the members to move them into sealing contact.

2. The method of sealing a glass member to an oxidized metal member said glass member being pre-formed to receive the metal member in substantially the desired fusing relation, the steps of positioning the members in substantial fusing relation whereby the glass member shields the desired fusing surface of the metal member, heating the members to fusing temperature, applying a reducing gas to the metal member to remove the oxide from the unshielded surfaces adjacent the desired fusing surface to prevent glass from wetting and adhering thereto, pulsating the pressure of the gas when the glass becomes plasticized to agitate the members to move them into sealing contact and conductively heating the glass surrounding the fusing areas to release internal stresses created therein by the cooling of the members.

3. A fixture for sealing a glass member to a metal member comprising a central supporting spindle of heat conductive material, a conductive guide pin for such a metal member on the spindle, a final locating surface for the metal member on the guide pin, a metal heat plate on the spindle for supporting the glass and metal members to be fused, an insulator for mounting the heat plate on the spindle, an induction heating coil for heating the metal member and the surrounding glass of the glass member to fusing temperature, the metal member being guided down on the pin to seat itself on the final locating surface when the glass becomes plastic, and means for cooling the spindle to conductively cool the guide pin and the contacting portion of the metal member guided thereon to restrict wetting of the plastic glass to such portions, said metal heat plate absorbing heat from the induction coil to conductively heat the glass member to equalize expansion therein while the seal is being formed and to release internal stresses therein during the cooling of the fused members.

4. A fixture according to claim 3 having means for moving and agitating the glass and metal members to accelerate the wetting of the glass to the metal comprising a supply of gas, means for pulsating the pressure of gas from the supply, and means for applying gas from the pulsating means against the glass and metal members.

References Cited in the file of this patent

UNITED STATES PATENTS

| | | |
|---|---|---|
| 1,692,998 | Ruben | Nov. 27, 1928 |
| 2,385,083 | Kemerer | Sept. 18, 1945 |
| 2,446,277 | Gordon | Aug. 3, 1948 |
| 2,450,130 | Gordon et al. | Sept. 28, 1948 |
| 2,483,205 | Jones | Sept. 27, 1949 |
| 2,515,706 | Greiner et al. | July 18, 1950 |
| 2,522,949 | Jarman | Sept. 19, 1950 |
| 2,686,390 | Williams et al. | Aug. 17, 1954 |